United States Patent
Wix et al.

(10) Patent No.: US 9,385,865 B2
(45) Date of Patent: Jul. 5, 2016

(54) CORRECTING DECIPHERING MIS-SYNCHRONIZATION IN A MOBILE COMMUNICATION TERMINAL

(71) Applicant: Marvell World Trade Ltd., St. Michael (BB)

(72) Inventors: Amit Wix, Petah-Tikva (IL); Boris Korenfeld, Bat-Yam (IL); Morag Agmon, Gedera (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 126 days.

(21) Appl. No.: 14/333,547

(22) Filed: Jul. 17, 2014

(65) Prior Publication Data

US 2015/0023504 A1 Jan. 22, 2015

Related U.S. Application Data

(60) Provisional application No. 61/847,676, filed on Jul. 18, 2013.

(51) Int. Cl.
| | |
|---|---|
| *G06F 21/00* | (2013.01) |
| *H04L 9/14* | (2006.01) |
| *H04W 12/08* | (2009.01) |
| *H04L 9/12* | (2006.01) |
| *H04L 29/06* | (2006.01) |

(Continued)

(52) U.S. Cl.
CPC .. *H04L 9/14* (2013.01); *H04L 9/12* (2013.01); *H04L 63/0457* (2013.01); *H04L 65/604* (2013.01); *H04W 12/02* (2013.01); *H04W 12/08* (2013.01); *H04L 1/0061* (2013.01); *H04L 2209/30* (2013.01); *H04L 2209/80* (2013.01); *H04W 88/02* (2013.01)

(58) Field of Classification Search
None
See application file for complete search history.

(56) References Cited

U.S. PATENT DOCUMENTS 6,643,815 B1 * 11/2003 Davis ................. H04L 1/0057
370/503
8,582,768 B2 11/2013 Alexander et al.
(Continued)

FOREIGN PATENT DOCUMENTS

| EP | 1928130 A2 | 6/2008 |
| JP | 2006217100 A | 8/2006 |
| WO | 2005109741 A1 | 11/2005 |

OTHER PUBLICATIONS

ETSI TS 125 322 , "Universal Mobile Telecommunications System (UMTS);Radio Link Control (RLC) protocol specification", (3GPP TS 25.322, version 11.2.0, Release 11), 94 pages, Apr. 2013.
(Continued)

*Primary Examiner* — Shin-Hon Chen (57) ABSTRACT

A method includes, in a mobile communication terminal, receiving a signal, which carries media content that has been encrypted after being compressed in accordance with a compression protocol having a plurality of predefined configurations. Each configuration specifies a respective compression mode of the compression protocol. The received signal is decrypted, and one or more parameters that define a configuration of the compression protocol that was used for compressing the media content are determined from the decrypted signal. An absence of match is detected when the determined one or more parameters do not match any of the plurality of predetermined configurations of the compression protocol. An error in decrypting the received signal is identified based on detecting the absence of a match.

18 Claims, 3 Drawing Sheets

(51) Int. Cl.
*H04W 12/02* (2009.01)
*H04K 1/00* (2006.01)
*G06F 11/00* (2006.01)
*H04W 88/02* (2009.01)
*H04L 1/00* (2006.01)

(56) References Cited

U.S. PATENT DOCUMENTS

| | | | | |
|---|---|---|---|---|
| 2005/0226227 | A1* | 10/2005 | Kim | H04W 88/12 370/352 |
| 2006/0212770 | A1* | 9/2006 | Fischer | G01R 31/318335 714/742 |
| 2008/0123655 | A1* | 5/2008 | Kim | H04L 1/1867 370/394 |
| 2009/0316904 | A1 | 12/2009 | Klingenbrunn et al. | |
| 2010/0332933 | A1* | 12/2010 | Kubota | H04L 9/12 714/746 |
| 2012/0207302 | A1* | 8/2012 | Alexander | H04W 12/02 380/255 |

OTHER PUBLICATIONS

ETSI TS 125 321, "Universal Mobile Telecommunications System (UMTS);Medium Access Control (MAC) protocol specification", (3GPP TS 25.321, version 11.5.0, Release 11), 212 pages, Jan. 2014.
ETSI TS 126 101, "Digital cellular telecommunications system (Phase 2+);Universal Mobile Telecommunications System (UMTS);LTE;Mandatory speech codec speech processing functions;Adaptive Multi-Rate (AMR) speech codec frame structure", (3GPP TS 26.101, version 11.0.0 Release 11), 22 pages, Oct. 2012.
ETSI TS 126 201, "Digital cellular telecommunications system (Phase 2+);Universal Mobile Telecommunications System (UMTS);LTE;Speech codec speech processing functions;Adaptive Multi-Rate—Wideband (AMR-WB) speech codec; Frame structure", (3GPP TS 26.201, version 11.0.0, Release 11), 24 pages, Oct. 2012.
3GPP TS 33 102, "3rd Generation Partnership Project; Technical Specification Group Services and System Aspects; 3G Security; Security architecture (Release 11)", V11.5.1, 76 pages, Jun. 2013.
3GPP TS 25.211, "3rd Generation Partnership Project;Technical Specification Group Radio Access Network;Physical channels and mapping of transport channels onto physical channels (FDD)", version 11.0.0, Release 11, 60 pages, Dec. 2011.
3GPP TS 26.090, "3rd Generation Partnership Project;Technical Specification Group Services and System Aspects; Mandatory Speech Codec speech processing functions;Adaptive Multi-Rate (AMR) speech codec;Transcoding functions", version 11.0.0, Release 11, 55 pages, Sep. 2012.
Holma et al, WCDMA for UMTS—HSPA Evolution and LTE, Fourth Edition, Wiley, 58 pages, 2007.
U.S. Appl. No. 14/055,922 Office Action dated Jun. 12, 2014.
European Patent Application # 14177735.9 Search Report dated Dec. 5, 2014.
Sandlund et al., "The Robust Header Compression (ROHC) Framework", Internet Engineering Task Force (IETF), RFC 5795, 41 pages, Mar. 19, 2010.
3GPP TS 25.323, "3rd Generation Partnership Project; Technical Specification Group Radio Access Network; Packet Data Convergence Protocol (PDCP) specification (Release 8)", version 8.5.0, 42 pages, Dec. 2009.
Database WPI, week 200659, Thomson Scientific, London, UK, XP002675202, Aug. 17, 2006.
European Patent Application # 12155532.0 Search Report dated May 21, 2012.
U.S. Appl. No. 13/396,610 Office Action dated Jan. 28, 2013.

* cited by examiner

CORRECTING DECIPHERING MIS-SYNCHRONIZATION IN A MOBILE COMMUNICATION TERMINAL

CROSS-REFERENCE TO RELATED APPLICATIONS

This application claims the benefit of U.S. Provisional Patent Application 61/847,676, filed Jul. 18, 2013, whose disclosure is incorporated herein by reference.

FIELD OF THE DISCLOSURE

The present disclosure relates generally to communication systems, and particularly to methods and systems for deciphering in communication receivers.

BACKGROUND

Some communication systems transport voice signals in compressed form. In such systems, voice calls are typically transported over both the Radio Link Control (RLC) layer and the Medium Access Control (MAC) layer of the communication connection. The RLC layer is defined, for example, in "Universal Mobile Telecommunications System (UMTS); Radio Link Control (RLC) Protocol Specification," 3GPP TS 25.322, version 11.2.0, release 11, April, 2013, which is incorporated herein by reference. The MAC layer is defined, for example, in "Universal Mobile Telecommunications System (UMTS); Medium Access Control (MAC) protocol specification," 3GPP TS 25.321, version 11.5.0, Release 11, January, 2014, which is incorporated herein by reference.

Digitized voice signals may be compressed using a speech codec, such as the Adaptive Multi-Rate (AMR) speech codec, which is defined, for example, in "Digital cellular telecommunications system (Phase 2+); Universal Mobile Telecommunications System (UMTS); LTE; Mandatory speech codec speech processing functions; Adaptive Multi-Rate (AMR) speech codec frame structure," 3GPP TS 26.101, version 11.0.0, Release 11, October, 2012, which is incorporated herein by reference.

In UMTS, some voice signals are compressed using the AMR-WB codec, which is defined, for example, in "Digital cellular telecommunications system (Phase 2+); Universal Mobile Telecommunications System (UMTS); LTE; Speech codec speech processing functions; Adaptive Multi-Rate-Wideband (AMR-WB) speech codec; Frame structure," 3GPP TS 26.201, version 11.0.0, Release 11, October, 2012, which is incorporated herein by reference.

In the context of the present patent application and in the claims, the term "AMR" refers to a voice compression protocol in accordance with either the AMR or AMR-WB specifications cited above.

UMTS packets that carry data or voice are, at times, encrypted in order to provide secure communication. Ciphering in UMTS is defined, for example, in "Digital cellular telecommunications system (Phase 2+); Universal Mobile Telecommunications System (UMTS); 3G security; Security architecture," 3GPP TS 33.102, version 11.5.1, Release 11, July, 2013, which is incorporated herein by reference.

In some communication systems, a lack of packet synchronization between the sending and the receiving ends may result in decryption errors. U.S. Pat. No. 8,582,768, whose disclosure is incorporated herein by reference, describes a method in a receiver, including receiving from a transmitter a sequence of communication packets, which carry data encrypted with an encryption scheme. The encryption scheme depends on a counter value that is incremented independently by each of the transmitter and the receiver. Attempts are made to decrypt the data of a received packet multiple times using different, respective counter values, to produce multiple respective decrypted outputs. A decrypted output in which the data has been decrypted correctly is identified, and the data of the received packet is recovered from the identified decrypted output.

The description above is presented as a general overview of related art in this field and should not be construed as an admission that any of the information it contains constitutes prior art against the present patent application.

SUMMARY

An embodiment that is described herein provides a method including, in a mobile communication terminal, receiving a signal carrying media content that has been encrypted after being compressed in accordance with a compression protocol having a plurality of predefined configurations. Each configuration specifies a respective compression mode of the compression protocol. The received signal is decrypted, and one or more parameters, which define a configuration of the compression protocol that was used for compressing the media content, are determined from the decrypted signal. An absence of a match is detected when the determined one or more parameters do not match any of the plurality of predetermined configurations of the compression protocol. An error in decrypting the received signal is identified based on detecting the absence of match.

In some embodiments, the compression protocol includes an Adaptive Multi-Rate (AMR) voice compression protocol that carries the compressed voice in AMR frames, and by which the one or more parameters are carried in Silence Insertion Description (SID) frames, and determining the one or more parameters includes determining the one or more parameters based on a SID Type Indicator (STI) bit in the SID frames. In other embodiments, determining the one or more parameters includes determining Comfort Noise (CN) parameters or a data rate parameter, according to a value of the STI bit.

In yet other embodiments, decrypting the signal includes producing multiple media frames of the compressed media content, the one or more parameters include a predefined data pattern that is present in at least one of the multiple media frames only when decryption of the received signal is error-free, and identifying the error includes detecting that none of the multiple media frames contains the predefined data pattern.

In an embodiment, the plurality of predetermined configurations includes one or more valid data rates of the media compression protocol, and identifying the error includes detecting that the determined one or more parameters do not match any of the one or more valid data rates. In another embodiment, decrypting the signal includes deriving a decryption key based on a first sequence number, and including correcting the identified error by deriving the decryption key from a second sequence number different from the first sequence number and checking whether the error is resolved when the decryption key is derived from the second sequence number. In yet another embodiment, checking whether the error is resolved includes verifying that each of the one or more parameters matches at least one of the plurality of predetermined configurations of the compression protocol.

In some embodiments, correcting the error includes setting the second sequence number to differ from the first sequence number by no more than a predefined integer. In other embodiments, the media content includes an audio or speech content, and the compression protocol includes an audio or speech compression protocol. In yet other embodiments, the media content includes video content, and the compression protocol includes a video compression protocol.

In an embodiment, each configuration in the plurality of predefined configurations comprises a valid compression mode of the compression protocol.

There is additionally provided, in accordance with an embodiment that is described herein, an apparatus including a receiver and processing circuitry. The receiver is configured to receive a signal including media content that has been encrypted after being compressed in accordance with a compression protocol having a plurality of predetermined configurations, each configuration specifies a respective compression mode of the compression protocol. The processing circuitry is configured to decrypt the received signal, to determine from the decrypted signal one or more parameters that define a configuration of the compression protocol that was used for compressing the media content, and to identify an error in decrypting the received signal by detecting that the determined one or more parameters do not match any of the plurality of configurations of the compression protocol.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

In some communication protocols, a sequence of communication packets is encrypted with an encryption scheme that depends on a counter value. As a security measure, the counter value is not transmitted over the air, but is rather incremented independently by the transmitter and the receiver. In order to decrypt a packet, the receiver must possess the correct counter value and provide it to the decryption circuitry. A mechanism of this sort is used, for example, when communicating voice calls over packet networks, such as, for example UMTS networks. In some cases, however, the receiver may miss an unknown number of packets in the sequence. In such a case, the receiver may lose track of the correct counter value and therefore fail to decrypt subsequent packets.

Embodiments that are described herein provide improved methods and systems for processing encrypted packets in communication receivers. In the disclosed techniques, the encryption key in the transmitter and the decryption key in the receiver depend on a local counter value, which is referred to as a Hyper Frame Number (HFN). The local HFN value increments, per packet, at the transmitter and at the receiver, independently. The disclosed techniques identify scenarios in which the transmitter and the receiver lose synchronization with respect to the counter value.

In some embodiments, during a secure voice call, the receiver receives encrypted packets that comprise frames of voice signals that are compressed in accordance with the AMR specifications (also referred to as AMR frames). The AMR specifications define a set of compression modes or configurations, of which only a partial subset of configurations are valid for the given communication session. In an embodiment, the valid configurations are negotiated between the communicating parties, e.g., at session setup. During a given voice call, the AMR frames comprise voice signals that are compressed based only on the valid configurations.

In some embodiments, at least some of the AMR frames include parameters that define the actual AMR configurations that were used to compress the voice signals, such as, for example, Silence Insertion Description (SID) frames. SID frames typically carry Comfort Noise (CN) information at times of the conversation when a user is listening and is not producing voice or other signals.

In an embodiment, the receiver decrypts the packets using a key, which depends on the local HFN value. As explained above, if the HFN values used for encryption and decryption match, the decryption succeeds, and the parameters in the SID frames should match at least one of the valid AMR configurations. If, on the other hand, the HFN values are not aligned, decryption is likely to fail, in which case the receiver extracts meaningless configuration parameters out of the SID frames.

In some embodiments, the receiver identifies an HFN mis-synchronization event upon detecting that the configuration parameters in the SID frames do not match any of the valid AMR configurations. Example embodiments for detecting HFN mis-synchronization are described below. In one embodiment, the configuration parameters comprise Comfort Noise (CN) parameters that are expected to be cleared for a certain type of SID frames.

In another embodiment, the configuration parameters comprise a set of supported compression data rates. Typically, only a small subset of these data rates is configured as valid for a given communication session. In this embodiment, the receiver detects HFN mis-synchronization when the actual data rate parameter in the SID frames does not match any of the configured valid data rates.

In some embodiments, when detecting mis-synchronization, the receiver automatically corrects the value of the HFN. In an embodiment, the receiver iteratively searches for an HFN value for which the decryption succeeds. When the receiver finds an HFN value that resolves the mis-synchronization, this value replaces the HFN value that caused the decryption to fail.

In the disclosed embodiments, the receiver detects mis-synchronization when the actual AMR configuration fails to match any of the valid configurations that were negotiated between the sender and the receiver, e.g., at call setup. In addition, the receiver corrects the HFN value, on the fly, when detecting mis-synchronization.

The disclosed techniques are useful, for example, when the received media content is compressed in a highly compact manner and does not contain any fixed data patterns that can be used as indicators of ciphering mis-synchronization. Moreover, when using the disclosed techniques, the receiver re-attempts to decipher a packet using a different HFN value in response to detecting mis-synchronization. As a result, computational complexity is reduced.

Figure 1:
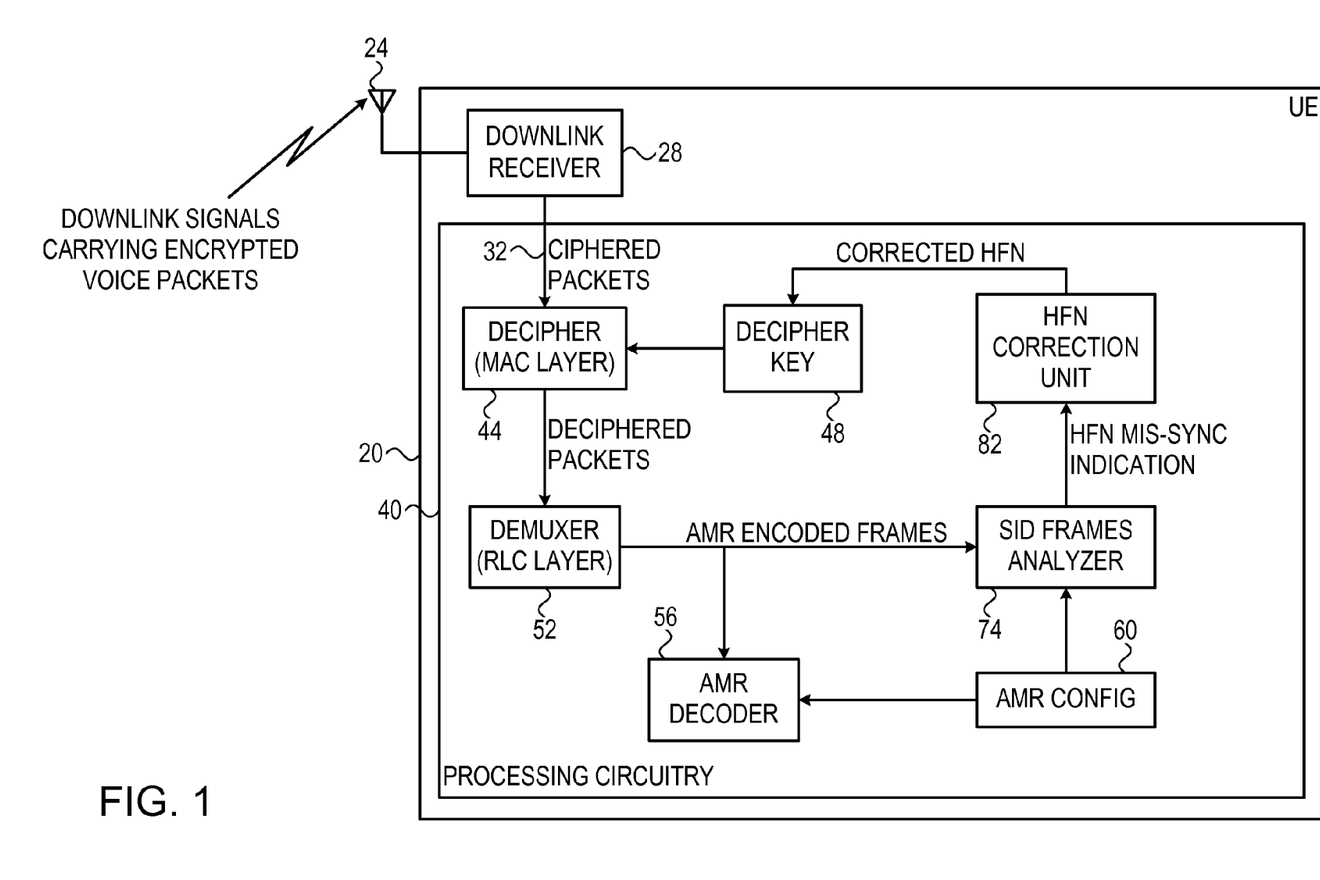
FIG. 1 is a block diagram that schematically illustrates a mobile communication terminal, in accordance with an embodiment that is described herein.

FIG. 1 is a block diagram that schematically illustrates a mobile communication terminal 20, in accordance with an embodiment that is described herein. In various embodiments, terminal 20 comprises, for example, a cellular phone, a wireless-enabled mobile computing device, or any other suitable type of wireless communication terminal.

In the present example, terminal 20 comprises a User Equipment (UE) in a 3GPP UMTS network. In alternative embodiments, terminal 20 may operate in any other suitable communication network and in accordance with any other suitable communication standard or protocol. The disclosed techniques are applicable, for example, to any encryption scheme in which ciphering is implemented in the MAC layer, and that uses the RLC layer Transparent Mode (TM). The MAC and RLC layers are described, for example, in respective specifications 3GPP TS 25.321 and 3GPP TS 25.322 cited above. Although the embodiments described herein refer mainly to downlink reception, i.e., to receivers in mobile communication terminals, the disclosed techniques are also applicable to uplink reception, i.e., to receivers in base stations.

In the present embodiment, UE 20 receives a Radio Frequency (RF) downlink signal from a base station (e.g., UMTS NodeB—not seen in the figure). The downlink signal received by UE 20 carries a sequence of data packets (also referred to as Packet Data Units—PDUs), which carries a voice call in accordance with the UMTS specifications. The data and at least some of the header fields of each packet are encrypted in order to provide data security.

In an embodiment, UE 20 and the base station increment a counter value that is referred to as MAC-d Hyper Frame Number (HFN), or simply HFN for brevity. According to the UMTS specifications, the MAC-d HFN is used for radio bearers that are mapped onto transparent mode RLC. The HFN value is incremented (cyclically) once every MAC PDU that is encrypted or decrypted. More specifically, in an embodiment, the HFN is incremented once every 2.56 seconds, i.e., when a CFN (Connection Frame Number), which increments at 10 ms clock rate, completes a 256 cycle count. HFN mis-synchronization may occur, when the initial MAC HFN value is negotiated, for example, if the signal received is attenuated and cannot be decoded correctly for a period of 2.56 seconds or longer.

The local current value of the HFN is used by the base station and the UE as part of a key for encrypting and decrypting the packets. Typically, the base station encrypts each transmitted packet using the current HFN value (in combination with other parameters), and the UE uses the current HFN value for decrypting each received packet. A similar process is performed in the opposite direction, for packets transmitted from the UE to the base station.

As a security measure, the HFN value is not transmitted in the packets in any way. Instead, the base station and the UE each increment the HFN value independently by counting transmitted or received packets since the initial value of the HFN was negotiated and set. This mechanism helps to prevent illegitimate decryption of packets by a receiver that is not synchronized with the base station (and is therefore unaware of the current HFN value). The HFN is typically initialized to an initial value that is negotiated between terminal 20 and the base station during a security configuration procedure.

In some cases, however, UE 20 may miss an unknown number of packets in the received sequence. Packet loss may be caused, for example, by a temporary attenuation of the communication channel due to movement of the UE or for any other reason. An event of this sort may cause a mismatch or mis-synchronization between the HFN value that is incremented by the base station and the HFN value that is incremented by UE 20.

When packet reception is resumed (and unless the mismatch is corrected) the UE attempts to decrypt subsequent packets using incorrect HFN values (HFN values that are different from those used by the base station for encrypting the respective packets), in an embodiment. As a result, the decryption is likely to fail and the connection or call may be dropped. In some embodiments, UE 20 identifies and recovers from possible decryption errors of this sort using techniques that are described in greater detail below.

In the embodiment of FIG. 1, UE 20 comprises an antenna 24 for receiving the downlink RF signal that carries the sequence of packets transmitted by the base station. A downlink receiver 28 typically receives the downlink RF signal from antenna 24, down-converts the signal to baseband and digitizes the baseband signal. Receiver 28 outputs a sequence of encrypted packets 32.

UE 20 comprises processing circuitry 40, which performs the various digital and baseband processing tasks of the terminal. Processing circuitry 40 comprises a decipher 44, which decrypts the received packets. Decipher 44 accepts packets 32 and a deciphering key 48, which depends on the current HFN value (usually in combination with other parameters). Decipher 44 decrypts each packet using key 48, and outputs the deciphered packets to a de-multiplexer 52. As explained above, the decryption of a packet will be successful only if the HFN value used to derive key 48 for decryption by decipher 44 matches the HFN value used by the base station for encrypting the packet.

In some embodiments, the UE processes PDUs 32 according to a layered protocol that includes a MAC layer and an RLC layer. The MAC layer is defined, for example, in 3GPP TS 25.321 specifications cited above. The RLC layer is defined, for example, in 3GPP TS 25.322 specifications cited above. In the present example, the implementation of de-multiplexer 52 is part of the implementation of the RLC layer, which operates in Transparent Mode (TM), and decipher 44 is implemented as part of the MAC layer. In alternative embodiments, decipher 44 and de-multiplexer 52 are implemented as independent units, or as part of any other suitable protocols or layers.

De-multiplexer 52 receives packets that have possibly been transmitted over multiple radio bearers (e.g., to communicate the packets at a higher data rate than the capacity of a single radio bearer), in an embodiment, and reassembles the received packets into data frames. Each data frame corresponds to one or more decrypted packets, in an embodiment. In the present example, when communicating a voice call, de-multiplexer outputs data frames according to the AMR codec specifications, which are defined, for example, in 3GPP TS 26.101 specifications, cited above. In alternative embodiments, the data frames may be encoded or compressed according to any other suitable protocol, such as, for example AMR-WB.

An AMR decoder 56 accepts the encoded AMR frames from de-multiplexer 52, and decodes the voice signals according to the AMR specifications and AMR configurations 60. AMR configurations 60 comprise valid configurations for operating the AMR decoder, such as, for example, valid operational data rates. Terminal 20 typically negotiates the set of valid configurations when setting up the communication session with the base station. Typically, the number of valid configurations in AMR configurations 60 is smaller than the total number of configurations that the AMR specifications define.

A SID frames analyzer 74 (also referred to as "frame analyzer" or simply "analyzer" for brevity) receives AMR frames from de-multiplexer 52, and identifies among these frames Silence Insertion Description (SID) frames. In some embodiments, the SID frames include parameters that define the actual operating configurations of the AMR decoder.

When the packets are decrypted correctly (i.e., using synchronized HFN values), the configuration parameters in the SID frames are expected to match AMR configurations 60. On the other hand, when the current HFN value at the UE is unsynchronized with the current HFN value at the base station, the decryption is likely to fail, and therefore the probability that the configuration parameters read from the SID frames match any of the valid configurations in AMR configurations 60 is very low.

In an embodiment, analyzer 74 checks whether the configuration parameters carried within the SID frames match any of the valid configurations in AMR configurations 60, and outputs a corresponding indication of the synchronization status to an HFN correction unit 82. It is assumed that mis-synchronization of the HFN values when decrypting a given packet is equivalent to failing in decrypting the packet.

HFN correction unit 82 corrects the HFN value when analyzer 74 detects HFN mis-synchronization. HFN correction unit 82 searches for an alternative HFN value for which the decrypting is successful. In some embodiments, HFN correction unit 82 iteratively increments the current HFN value, and for each HFN value re-decrypts the packet in which mis-synchronization occurred, and checks the configuration parameters in the corresponding SID frames. In an embodiment, HFN correction unit 82 limits the search to alternative HFN values that differ from the current HFN value by no more than a predefined integer. Upon finding an HFN value that resolves the mis-synchronization, HFN correction unit 82 replaces the HFN value that caused the decryption to fail with this found HFN value.

The terminal configuration shown in FIG. 1 is an example configuration, which is depicted in a highly simplified manner solely for the sake of clarity. In alternative embodiments, any other suitable terminal configuration can be used. Terminal elements that are not mandatory for understanding of the disclosed techniques have been omitted from the figure for the sake of clarity.

In various embodiments, some or all of the elements of terminal 20, including receiver 28 and processing circuitry 40, are implemented in hardware, such as implementing elements of the receiver using one or more Radio Frequency Integrated Circuits (RFICs), or implementing the processing circuitry using one or more Field-Programmable Gate Arrays (FPGAs) or Application-Specific Integrated Circuits (ASICs). In alternative embodiments, certain elements of terminal 20 are implemented in software, or using a combination of hardware and software elements.

In some embodiments, certain terminal elements, such as certain elements of processing circuitry 40, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

Figure 2:
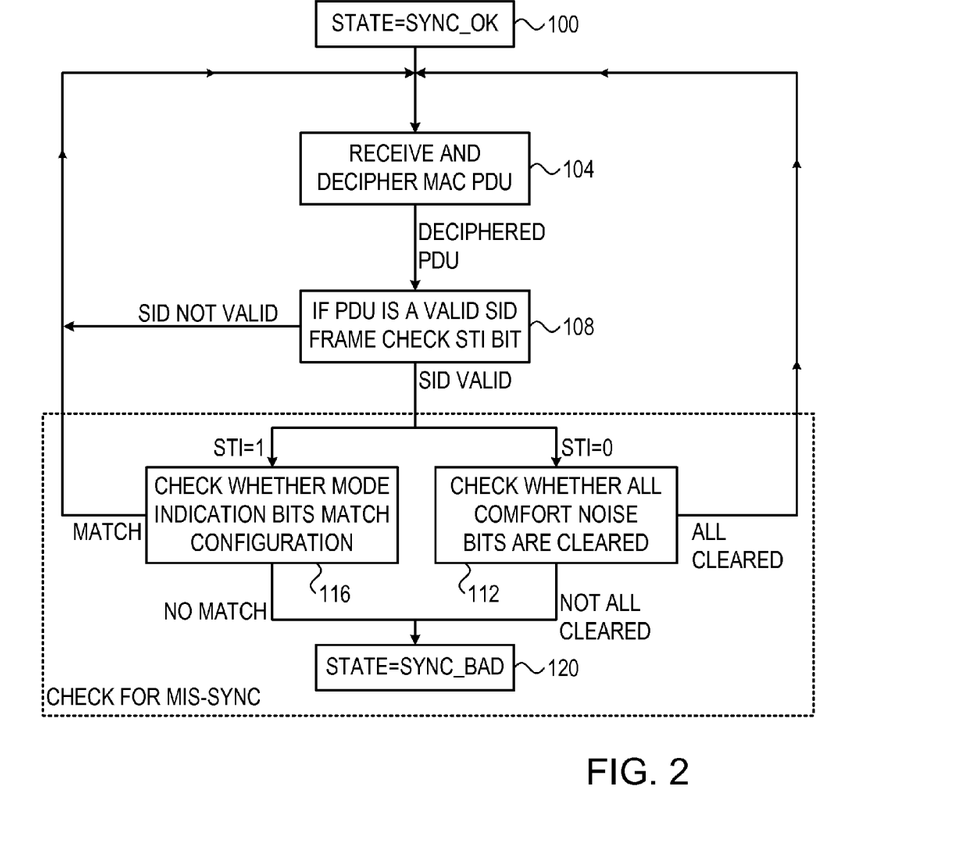
FIG. 2 is a flow chart that schematically illustrates a method for detecting lack of deciphering synchronization in a communication terminal, in accordance with an embodiment that is described herein.

FIG. 2 is a flow chart that schematically illustrates a method for detecting deciphering mis-synchronization in terminal 20, in accordance with an embodiment that is described herein. The method may be carried out by the various elements of processing circuitry 40 when downlink receiver 28 sends to the processing circuitry a new packet. In the present example, analyzer 74 in the processing circuitry comprises a binary state (not shown) that holds the status of the HFN synchronization, and can be set to either SYNC_OK or SYNC_BAD.

The method begins with analyzer 74 setting the synchronization state to SYNC_OK, at a state clearing operation 100, to indicate that the current HFN value is assumed to be synchronized. At a receiving operation 104, decipher 44 receives a ciphered MAC PDU from downlink receiver 28. In an embodiment, the decipher decrypts the MAC PDU using key 48 whose value is based on the current HFN value, and outputs a respective deciphered PDU comprising an AMR frame. In some embodiments, at operation 104, de-multiplexer 52 reassembles the deciphered PDU (possibly with additional decrypted PDUs) and outputs a respective AMR frame.

At an analysis operation 108, analyzer 74 verifies that the AMR frame comprises a SID frame, by inspecting, for example, the frame header. Additionally, analyzer 74 verifies that the frame is valid, for example by verifying the Cyclic Redundancy Code (CRC) of the frame. In alternative embodiments, SID frames analyzer 74 can use any other suitable method to verify that the AMR frame is a valid SID frame.

According to the AMR specifications, SID frames comprise a SID Type Indicator bit, three Mode Indication (MI) bits that specify one of eight AMR codec modes, and thirty five bits of Comfort Noise (CN) parameters. Interpretation of the MI bits, and the bit classification for SID frames, are described, for example, in respective Tables 1a and 3 of 3GPP TS 26.101, cited above.

If, at operation 108, analyzer 74 discovers that the AMR frame is not a valid SID frame, the method loops back to operation 104 to receive subsequent MAC PDUs. Otherwise, analyzer 74 checks the type of the SID frame by examining a SID Type Indicator (STI) bit in the frame.

Table 1 below depicts information regarding bit classification for SID frames from Table 3 of 3GPP TS 26.101, cited above.

TABLE 1

Bit classification for SID frames
CLASS A

| SID Type Indicator (STI) | MODE Indication MI(i) | Comfort Noise Parameter S(i) |
| --- | --- | --- |
| 1 (="1") | 3 | 35 |
| 1 (="0") | 3 | 35 (="0") |
| 1 | 3 | 35 |

As seen in the second entry of the third column of Table 1, when the STI bit is set to "0" (SID_FIRST in the AMR specifications terminology), all the thirty five CN bits should be cleared. If, at a CN verification operation 112 (executed when STI=0), analyzer 74 found that all the CN bits are zeroed, the deciphering has probably been successful and the method loops back to operation 104 above. Otherwise, not all the CN bits are cleared, which indicates that the deciphering has failed with high probability.

If, on the other hand, the STI bit equals "1" (SID_UPDATE in the AMR specifications terminology), analyzer 74 executes a configuration validation operation 116. At operation 116, analyzer 74 can use any suitable method for validating the AMR configuration. In some embodiments, AMR configurations 60 comprise one or more AMR codec modes. Table 2 below describes interpretation of the MI bits, which is drawn from Table 1a of 3GPP TS 26.101, cited above. AMR configurations 60 typically comprise only a partial subset of the eight valid modes of Table 2.

TABLE 2

MI bits interpretation

| Mode Indication (MI) | Frame Content (AMR mode) |
|---|---|
| 0 | AMR 4.75 kbit/s |
| 1 | AMR 5.15 kbit/s |
| 2 | AMR 5.90 kbit/s |
| 3 | AMR 6.70 kbit/s (PDC-EFR) |
| 4 | AMR 7.40 kbit/s (TDMA-EFR) |
| 5 | AMR 7.95 kbit/s |
| 6 | AMR 10.2 kbit/s |
| 7 | AMR 12.2 kbit/s (GSM-EFR) |

At operation 116, analyzer 74 compares the MI value written in the SID frame to the valid configurations in AMR configurations 60. If the MI bits match any of the valid configurations, the method loops back to operation 104 above. Otherwise, the MI value in the SID frame does not match any of the parameters in AMR configuration 60, which indicates HFN mis-synchronization.

If not all the CN bits are cleared at operation 112, or no match is detected at operation 116, analyzer 74 sets the synchronization state to SYNC_BAD, at a mis-synchronization detection operation 120, to indicate (e.g., to HFN correction unit 82) of an HFN synchronization problem, and the method then terminates.

The method of FIG. 2 above does not guarantee the detection of HFN mis-synchronization in a given SID frame. As will be explained, however, the probability to detect a persistent mis-synchronization increases with the number of analyzed SID frames.

For example, the AMR specifications define eight compression data rates, and if we assume that in a given session only four of these data rates serve as valid data rates, the probability of not detecting mis-synchronization (when analyzing a SID frame whose STI bit is set to "1") is 50%.

Table 3 below estimates the probabilities of detection and mis-detection of HFN mis-synchronization for AMR and AMR-WB under the following assumptions: (i) four out of eight configurations are valid in AMR, (ii) five out of nine configurations are valid in AMR-WB, and (iii) the STI bit is set to "0" or with equal probabilities.

TABLE 3

Probabilities of detection and mis-detection.

| | AMR | AMR-WB |
|---|---|---|
| Probability of detection | 75% | 84.375% |
| Probability of mis-detection | 25% | 15.625% |

Thus, for AMR, the probability to detect mis-synchronization by analyzing a single SID frame is 75%, and by analyzing up to three SID frames is about 98%. Additionally, using the probabilities given for AMR in Table 3, the number of SID frames that should be analyzed to detect HFN mis-synchronization is evaluated to be about 1.3 frames on average.

In the method of FIG. 2, checking the configuration parameters at operation 116 is carried out when the STI bit equals "1". In alternative embodiments, operation 116 can be executed independently of the SID frame type.

Figure 3:
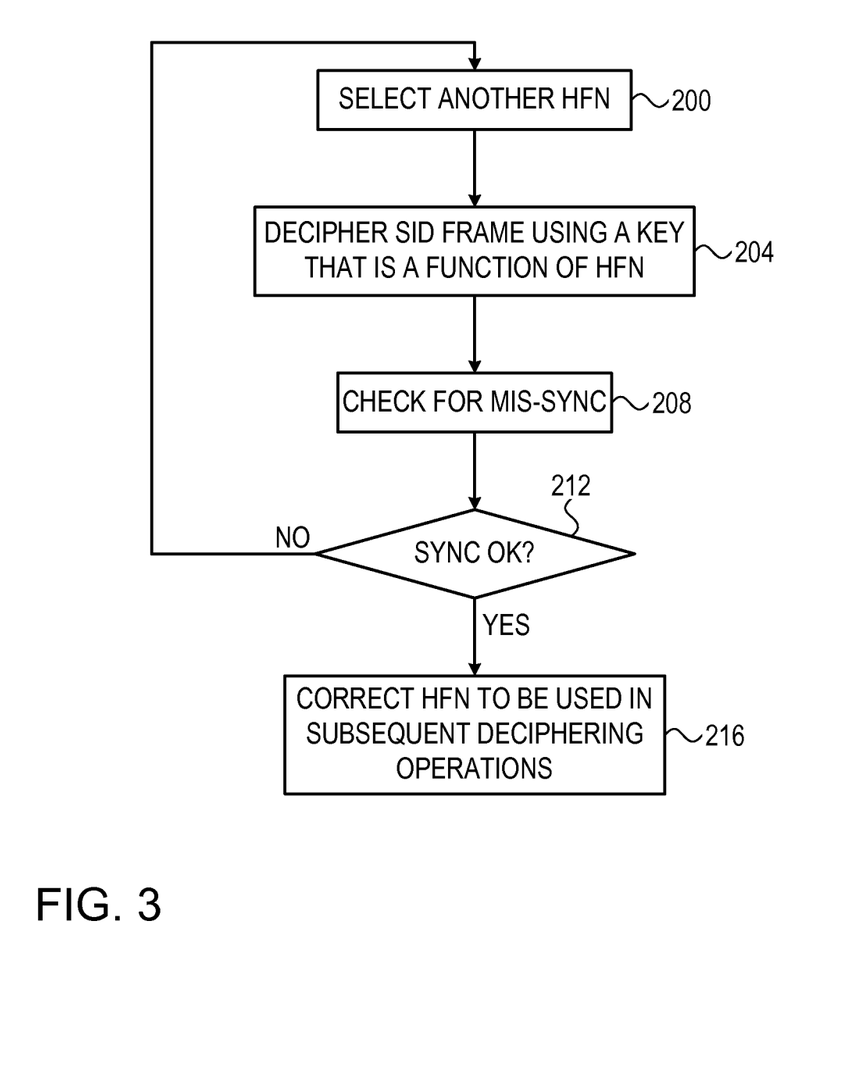
FIG. 3 is a flow chart that schematically illustrates a method for automatic deciphering re-synchronization, in accordance with an embodiment that is described herein.

FIG. 3 is a flow chart that schematically illustrates a method for automatic HFN re-synchronization, in accordance with an embodiment that is described herein. The method can be executed, for example, when HFN correction unit 82 receives an indication of an HFN synchronization problem from analyzer 74.

The method begins with HFN correction unit 82 selecting an HFN value, at a selection operation 200. The selected HFN value is different from the current HFN value that caused the deciphering to fail. HFN correction unit 82 can use any suitable method for selecting an HFN value.

In one embodiment, it is assumed that a loss of one or more packets caused HFN mis-synchronization, and therefore the selected HFV value should be larger than the current HFN. For example, if two packets were lost, the current HFN value at the receiver should increase by two in order to re-synchronize with the sender HFN value. Since, however, the number of lost packets is unknown to the receiver, HFN correction unit 82 searches for the correct HFN by iteratively incrementing the current HFN value and checking if mis-synchronization is resolved, as will be described below. Alternatively or additionally, HFN correction unit 82 can select the HFN value by searching in the vicinity of the current HFN value in any other suitable order.

At a deciphering operation 204, decipher 44 decrypts the packet that corresponds to the analyzed SID frame using key 48 whose value is based on the selected HFN value. At a checking for mis-synchronization operation 208, analyzer 74 checks whether deciphering the SID frame using the selected HFN has succeeded. In some embodiments, analyzer 74 carries out the checking at operation 208 by setting the state to SYNC_OK and then executing operations 112, 116 and 120 of the method of FIG. 2, above.

If at a synchronization validation operation 212, HFN correction unit 82 discovers that the deciphering has failed, the method loops back to operation 200 to select another HFN value for the next iteration. Otherwise, the deciphering has succeeded using the last selected HFN, and the method proceeds to a correction operation 216, in which the current HFN value is replaced with the HFN value of the last iteration, and the method then terminates. In an embodiment, following the termination of the method of FIG. 3, analyzer 74 resets the synchronization state to SYNCH_OK.

The techniques outlined above for detecting and correcting HFN mis-synchronization are described solely by way of example. In alternative embodiments, UE processing circuitry 40 may use various other techniques for detecting and correcting HFN mis-synchronization. For example, the disclosed techniques are applicable to speech codecs other than AMR, such as, the AMR-WB codec, which is defined, for example in 3GPP TS 26.201, cited above. As another example, the disclosed techniques are also applicable to media content other than speech, such as, for example, audio and video content.

Although in the embodiments that are described above, the actual compression configurations are carried in AMR SID frames, in alternative embodiments the actual configurations can be delivered in any other suitable data frames or packets.

In some embodiments, the valid and/or actual AMR parameters are sent to the terminal via the RLC layer, which delivers the parameters also to the MAC (the RLC and MAC layers reside in L2) and PHY (L1) layers. Thus, in these embodiments, the terminal may acquire these parameters from any of the three layers.

Although the embodiments described herein mainly address correcting deciphering mis-synchronization during voice calls over mobile communication networks, the methods and systems described herein can also be used in other applications, such as in any system delivering compressed voice calls using an AMR or AMR-WB protocol, wherein the compression key depends on a local count number.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a mobile communication terminal, receiving a signal, which carries media content that has been encrypted after being compressed in accordance with a compression protocol having a plurality of predefined configurations, wherein each configuration specifies a respective compression mode of the compression protocol;
decrypting the received signal using a decryption key that is derived based on a first sequence number, and determining from the decrypted signal one or more parameters that define a configuration of the compression protocol that was used for compressing the media content;
detecting that the determined one or more parameters do not match any of the plurality of predetermined configurations of the compression protocol;
identifying an error in decrypting the received signal based on the absence of match; and
correcting the identified error by deriving the decryption key from a second sequence number different from the first sequence number and checking whether the error is resolved when the decryption key is derived from the second sequence number.

2. The method according to claim 1, wherein the compression protocol comprises an Adaptive Multi-Rate (AMR) voice compression protocol that carries the compressed voice in AMR frames, and by which the one or more parameters are carried in Silence Insertion Description (SID) frames, and wherein determining the one or more parameters comprises determining the one or more parameters based on a SID Type Indicator (STI) bit in the SID frames.

3. The method according to claim 2, wherein determining the one or more parameters comprises determining Comfort Noise (CN) parameters or a data rate parameter, according to a value of the STI bit.

4. The method according to claim 1, wherein decrypting the signal comprises producing multiple media frames of the compressed media content, wherein the one or more parameters comprise a predefined data pattern that is present in at least one of the multiple media frames only when decryption of the received signal is error-free, and wherein identifying the error comprises detecting that none of the multiple media frames contains the predefined data pattern.

5. The method according to claim 1, wherein the plurality of predetermined configurations comprises one or more valid data rates of the media compression protocol, and wherein identifying the error comprises detecting that the determined one or more parameters do not match any of the one or more valid data rates.

6. The method according to claim 1, wherein checking whether the error is resolved comprises verifying that each of the one or more parameters matches at least one of the plurality of predetermined configurations of the compression protocol.

7. The method according to claim 1, wherein correcting the error comprises setting the second sequence number to differ from the first sequence number by no more than a predefined integer.

8. The method according to claim 1, wherein the media content comprises an audio or speech content, and wherein the compression protocol comprises an audio or speech compression protocol.

9. The method according to claim 1, wherein the media content comprises video content, and wherein the compression protocol comprises a video compression protocol.

10. The method according to claim 1, wherein each configuration in the plurality of predefined configurations comprises a valid compression mode of the compression protocol.

11. Apparatus, comprising:
a receiver, which is configured to receive a signal comprising media content that has been encrypted after being compressed in accordance with a compression protocol having a plurality of predetermined configurations, wherein each configuration specifies a respective compression mode of the compression protocol; and
processing circuitry, which is configured to derive a decryption key based on a first sequence number, to decrypt the received signal using the decryption key, to determine from the decrypted signal one or more parameters that define a configuration of the compression protocol that was used for compressing the media content, to identify an error in decrypting the received signal by detecting that the determined one or more parameters do not match any of the plurality of configurations of the compression protocol, and to correct the identified error by deriving the decryption key from a second sequence number different from the first sequence number and checking whether the error is resolved when the decryption key is derived from the second sequence number.

12. The apparatus according to claim 11, wherein the compression protocol comprises an Adaptive Multi-Rate (AMR) voice compression protocol that carries the compressed voice in AMR frames, and by which the one or more parameters are carried in Silence Insertion Description (SID) frames, and wherein the processing circuitry is configured to determine the one or more parameters based on a SID Type Indicator (STI) bit in the SID frames.

13. The apparatus according to claim 12, wherein the processing circuitry is configured to determine the one or more parameters by determining Comfort Noise (CN) parameters or a data rate parameter, according to a value of the STI bit.

14. The apparatus according to claim 11, wherein the one or more parameters comprise a predefined data pattern that is present in at least one of the multiple media frames only when decryption of the received signal is error-free, and wherein the processing circuitry is configured to decrypt the signal by producing multiple media frames of the compressed media content, and to identify the error by detecting that none of the multiple media frames contains the predefined data pattern.

15. The apparatus according to claim 11, wherein the plurality of predetermined configurations comprises one or more valid data rates of the media compression protocol, and wherein the processing circuitry is configured to identify the error by detecting that the determined one or more parameters do not match any of the one or more valid data rates.

16. The apparatus according to claim 11, wherein the processing circuitry is configured to check whether the error is resolved by verifying that each of the one or more parameters matches at least one of the plurality of configurations of the compression protocol.

17. A mobile communication terminal comprising the apparatus of claim 11.

18. A chipset for processing signals in a mobile communication terminal, comprising the apparatus of claim 11.

* * * * *